(12) United States Patent
Riguero et al.

(10) Patent No.: US 11,647,745 B2
(45) Date of Patent: May 16, 2023

(54) HERBICIDE COMPOSITION INCLUDING 2,4-D AND DICAMBA IN ACID FORM FORMULATED TOGETHER AS MICROEMULSION

(71) Applicant: 3 LOMAS S.A., Ciudad Autónoma de Buenos Aires (AR)

(72) Inventors: Cristian Manuel Riguero, Santa Fe (AR); Roberto Francisco Copani, Santa Fe (AR); Matías Carlos Monasterio, Buenos Aires (AR)

(*) Notice: Subject to any disclaimer, the term of this patent is extended or adjusted under 35 U.S.C. 154(b) by 201 days.

(21) Appl. No.: 17/100,001

(22) Filed: Nov. 20, 2020

(65) Prior Publication Data
US 2021/0212313 A1    Jul. 15, 2021

(51) Int. Cl.
*A01N 25/04*    (2006.01)
*A01N 37/38*    (2006.01)
*A01N 37/40*    (2006.01)

(52) U.S. Cl.
CPC .............. *A01N 25/04* (2013.01); *A01N 37/38* (2013.01); *A01N 37/40* (2013.01)

(58) Field of Classification Search
CPC ........ A01N 25/04; A01N 37/38; A01N 37/40; A01N 39/04
See application file for complete search history.

(56) References Cited

FOREIGN PATENT DOCUMENTS

AR        084462 A1    5/2013

*Primary Examiner* — Trevor Love
(74) *Attorney, Agent, or Firm* — Egbert, McDaniel & Swartz, PLLC

(57) ABSTRACT

Disclosed is a formulation having at least two auxinic hormonal herbicides, normally used separately in applications to control a wide variety of broadleaf weeds, present in fields without cultivation, during chemical fallows, and in crops such as winter cereals, corn and sorghum, that together have a synergistic effect on weed control. This effect is even greater in the microemulsion formulation that includes at least the two active ingredients, if compared to the conventional tank mix, this greater efficiency being attributed to the chemical compatibility that exists in the "ready mix" achieved by the correct choice of emulsifiers to maintain active emulsion, physical compatibility that translates into greater biological efficacy. Preferably, the herbicidal composition has at least: (i) from 7.5% to 40% of 2,4-D in its acidic form; and (ii) from 1.2% to 35% of Dicamba in its acid formic as active ingredients, formulated together in a microemulsion type formulation.

11 Claims, 4 Drawing Sheets

Graph No. 1: Comparative test of control efficacy of different microemulsion formulation in Conyzya spp.

FIG. 1

HERBICIDE COMPOSITION INCLUDING 2,4-D AND DICAMBA IN ACID FORM FORMULATED TOGETHER AS MICROEMULSION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

Field of the Invention

The present invention relates to a formulation comprising at least two auxinic hormonal herbicides (for example Dicamba and 2,4-D), normally used separately in applications to control a great variety of weeds, which grow in uncultivated fields (roads, fences and railways), during chemical fallows (period that elapses from the end of the harvest of one crop to the sowing of the next crop), and in crops such as winter cereals, corn and sorghum. Said auxinic hormonal herbicides applied together have a synergistic effect on weed control. This effect is even greater in the microemulsion formulation that includes at least the two active ingredients, if compared to the conventional tank mix; this greater efficiency being attributed to the chemical compatibility that exists in the "ready mix" achieved by the correct choice of emulsifiers to maintain active ingredients in an emulsion, physical compatibility that translates into greater biological efficacy.

Description of Related Art

The herbicide known as Dicamba (3,6-dichloro-2-methoxybenzoic acid) is a broad espectrum herbicide, first registered in 1967. This chemical compound is considered a chlorinated derivative of anisic acid.

Dicamba kills annual and perennial broadleaf weeds. Its main commercial applications are weed control for grain crops and turf areas. It is also used to control bushes and ferns in pastures, as well as to control legumes and cacti.

It is also used in combination with other herbicides. In such a case, Dicamba can be used for weeing control on range lands and other uncultivated areas (rows of fences, roads, and waste). Dicamba is toxic to coniferous species but is generally less toxic to grasses.

On the other hand, 2,4-D (2,4-dichlorophenoxyacetic acid) is a very common systemic hormonal auxin herbicide, used in the control of broadleaf weeds. It is the third most widely used herbicide in North America, and the most widely used in the world.

2,4-D was developed during World War II, with the purpose of increasing the crop yields of a nation in arms. In 1946 it was launched commercially, being the first successful selective herbicide, greatly aiding the control of weeds in wheat, corn, rice, and similar cereals, due to its ability to control dicotyledonous species, without affecting monocotyledons. 2,4-D is sold in various formulations under a wide variety of trade names. It continues to be used due to its low cost, despite having more selective, more effective, and less toxic products. 2,4-D is classified as a synthetic auxin, this is to say, it is considered a class of phytohormone.

Although these products are well known, any mixture between them is complementary, but not synergistic, mainly in herbicide mixtures in soils.

Therefore, it is important to find a better formulation that contains the mixture of active ingredients, in order to make the most of them, transferring them to the plant with the greatest effectiveness, and improving adherence to avoid washing by rain, wind, etc.

Previous experience has shown that the best ways to apply many of these products to crops are usually the emulsifiable concentrates in which they are presented and, even when conventional emulsions have had acceptable behaviors, it has been shown that microemulsions, with drop sizes below 0.4 μm in the spray broth, get much better results.

This is disclosed in the publication AR084462A1 published on May 22, 2013, which describes phytosanitary compositions in the form of microemulsions, with active ingredients formulated in their acid form, the active ingredients being selected from 3,6-dichloro-2-methoxybenzoic acid, 2,4-D (2,4-dichlorophenoxyacetic acid) among others and a mixture thereof, a non-ionic surfactant and an anionic surfactant, a proportion of polar cosolvent and a remaining percentage weight/volume of water.

However, this publication does not disclose the combined use of both acids formulated together in microemulsion.

BRIEF SUMMARY OF THE INVENTION

Therefore, it is an object of this invention to propose a herbicidal composition comprising at least (i) from 7.5% to 40% of 2,4-D in its acidic form and (ii) from 1.2% to 35% of Dicamba, also in its acidic form, as active ingredients, formulated together in a microemulsion-type formulation.

The above percentages are expressed in % by weight by volume of the composition.

Another object of the invention is to provide an active composition that also comprises 18% to 37% of an emulsifier, 2.5% to 9.1% of a co-solvent, 1.65% to 8.5% of a pH corrector, 0.05% to 0.17% of a defoamer, 0.30% to 1.0% of an acidifier, 1.5% to 7.8% of an antifreeze agent and 20% to 60% of a solvent (generally water), the percentages of which are expressed in % by weight by volume of the composition.

Additionally, it is another object of the invention to provide an active composition to be used in the control of weeds during the period of chemical fallow in winter cereals, corn and sorghum, for applications in areas without crops and natural and/or artificial pastures.

It is further another object of the invention, to propose its use in the control of broadleaf weeds such as *Sonchus oleraceus, Flaveria bidentis, Capsella bursa-pastoris, Datura ferox, Coronopus didymus, Amaranthus* spp., *Chenopodium album, Portulaca oleracea, Conyza* spp., *Bowlesia incana, Lamium amplexicaule, Xanthium cavanillesii,*

*Glycine max, Trinthema portulacastrum, Poligonum aviculare, Anoda cristata, Cardus acanthoides, Brassica rapa, Raphanus sativum, Polygonum convolvulus, Carduus nutans, Silybum marianum, Anthemis cotula, Matricaria chamomilla, Ammi majus, Viola arvensis, Erodium cicutarium, Xanthium sp., Centaurea solstitialis, Stellaria media, Datura ferox, Rumex crispus, Physallis mendocina, Kochia scoparia, Salsola kali, Chenopodium pumulio, Diplotaxis tenuifolia, Brassica campestris, Raphanus sativus, Brassica nigra, Rapistrum rugosum, Raphanus raphanistrum, Sicyos polyacanthus, Commelina virginica, Wedelia glauca, Ambrosia tenuifolia, Sida rhombifolia, Verbena intermedia, Ipomoea sp., Bidens pilosa, Cyperus spp., Geoffroea decorticans, Acacia aroma, Cestrum parqui, Centaurea calcitrapa, C. solstitialis, C. melitensis, Erodium cicutarium, Silybum marianum; Cardus pycnocephalus, Salsola Kali, Taraxacum officinale, Plantago lanceolata, Brassica campestris B. napus, Hydrocotyle bonaeriensis, Carduus nutans, Camelina sativa, Carthamus lanatus, Cirsium vulgare, Xanthium spinosum, Verbecina encelioide, Medicago lupulina, Kochia scoparia, Cychorum intybus; Ambrosia tenuifolia, Ammi visnaga, Onopordon acanthium, Cynara cardunculus, Conium maculatum, Convolvulus arvensis, Tagetes minuta, Salpichroa origanifolia, Alternathera philoxeroides, Dichondra repens, Hypochoeris brasilensis, Baccharis coridifolia, Melilotus indicus, Lonicera sempervirens, Artemisa verlotorum.*

BRIEF DESCRIPTION OF THE DRAWINGS

FIG. 1 is a graph (Graph No. 1) entitled "Comparative test of control efficacy of different microemulsion formulation in *Conyza* spp."

DETAILED DESCRIPTION OF THE INVENTION

Figure 2:
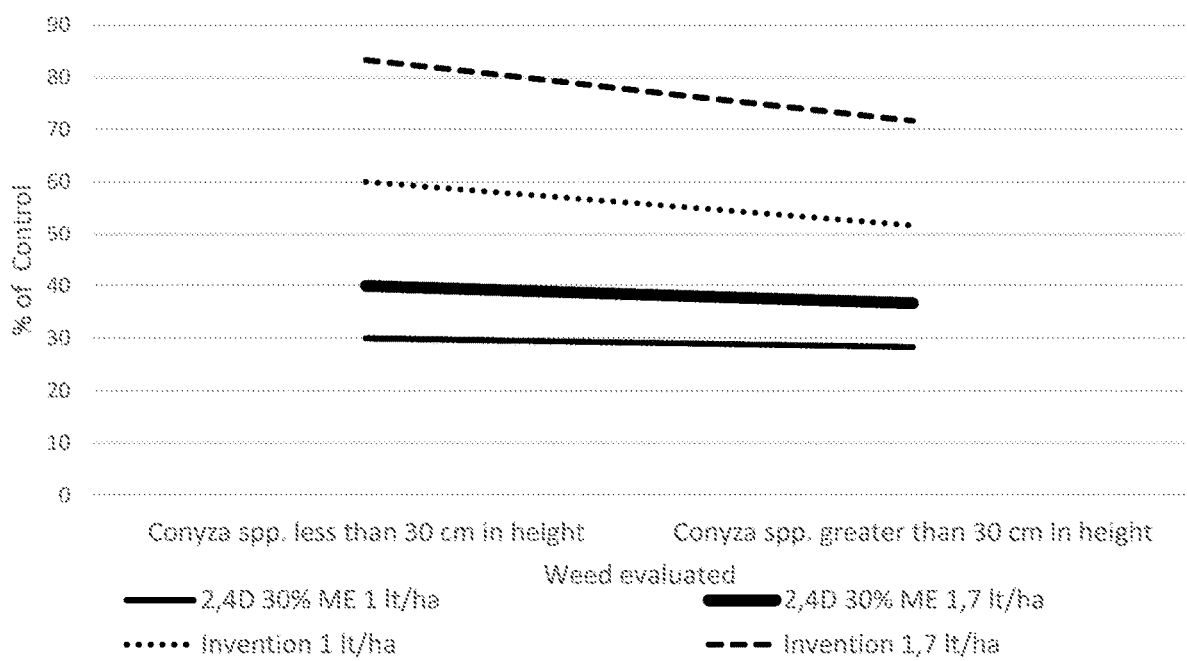
FIG. 2 is a graph (Graph No. 2) entitled "Control efficacy comparative trial using 2,4-D 30% ME vs. the invention in *Conyza* spp."

The present invention comprises a controlled mixture of herbicides in acidic form, in the proportions of (i) from 7.5% to 40% of 2,4-D in its acidic form and (ii) from 1.2% to 35% of Dicamba also in its acidic form expressed in % by weight by volume of the composition formulated together in a microemulsion-type formulation, which provides a surprising synergistic effect.

Our invention solves three fundamental problems over the use of these herbicides when applied separately:

1) Mainly, it improves the control of difficult weeds such as *Conyza* sp., which has confirmed resistance to the active ingredient glyphosate, and to the active ingredients classified within the ALS group herbicides (they inhibit the enzymatic action of the acetolactate synthetase), such as: Metsulfuron methyl, Chlororsulfuron Sulfometuron methyl, Imazetapyr, Imazapyr, Imazapic, Imazaquin, Diclosulam, Chlorimuron ethyl, Cloramulam methyl, Flumetsulam, Penoxsulam, Nicosulfuron, Iodosulfuron methyl, Foramsulfuron, Rimsulfuron, Mesosulfuron, Oxasulfuron, Thiencarbazone methyl, etc.).

2) It reduces the total amount of active ingredient applied per hectare compared to conventional treatments carried out by producers, reaching higher control levels. Efficacy tests show that it is possible to achieve a reduction of up to 60% of the total amount of active ingredients used when compared to formulations of the "Soluble Concentrate" type. For example, 261 grams per hectare of total active ingredient of our invention achieve equal or greater control performance in *Conyza* sp. than 684 grams per hectare of active ingredients formulated as soluble concentrates), and also an improvement in efficacy is achieved when compared with the tank mix of both herbicides formulated separately also in microemulsion, using the same amount of active ingredient per hectare.

3) Not only does it reduce the likelihood of confusion for end-users of the product when making tank mixes, since they only have to measure and incorporate a single product into the sprayer tank instead of two, but it also significantly reduces the amount of empty agrochemical containers, when compared with the tank mix of the same amount of active ingredients per hectare. In the following examples, we observe that even in different proportions of combination between the proposed components, the reduction of the amount of packages can vary from 13% (in a 3:1 ratio) to 120% (in a 15:1 ratio).

For the following tables, a potential market has been considered that would reach all the productive areas of Argentina, that is, approximately 32 million hectares (17 million hectares of soybeans, 6.5 million hectares of corn, 7.2 million hectares of wheat, 1.5 million hectares of sunflower, 0.7 million hectares of grain sorghum and 0.3 million hectares of cotton).

TABLE 1

Packaging reduction for a 3:1 combination ratio

| | Invention | | Tank mix | |
|---|---|---|---|---|
| | Dicamba | 2,4-D | Dicamba | 2,4-D |
| Composition (% by weight of active ingredient/liter of formulation) | 7.5 | 22.5 | 20.0 | 30.0 |
| Dose (liters/hectare of formulation) | | 1 | 0.375 | 0.75 |
| Dose (% by weight of active ingredient/liter of formulation) | 7.5 | 22.5 | 7.5 | 22.5 |
| Container size (in liters) | | 20 | 20 | 20 |
| Containers/hectare of invention | | 0.05 | 0.01875 | 0.0375 |
| Total containers/ha-tank mix | | | 0.05625 | |

For example, in 32 million potential hectares of use, and if we consider a use dose of 1 liter/hectare of the invention, the number of containers that would stop being used would be:

| | 32,000,000 | Potential hectares |
|---|---|---|
| | 1 | Use dose (liters/hectare) |
| Containers/hectare of invention | 0.05 | 0.01875  0.0375 |
| | | 600,000  1,200,000 |
| Total containers to use | 1,600,000 | 1,800,000 |
| Final reduction of packaging used | 13% | |

TABLE 2

Packaging reduction for a 9:1 combination ratio

| | Invention | | Tank mix | |
|---|---|---|---|---|
| | Dicamba | 2,4-D | Dicamba | 2,4-D |
| Composition (% by weight of active ingredient/liter of formulation) | 3.1 | 28.0 | 20.0 | 30.0 |
| Dose (liters/hectare of formulation) | 1 | | 0.375 | 0.75 |
| Dose (% by weight of active ingredient/liter of formulation) | 3.1 | 28.0 | 3.1 | 28.0 |
| Container size (in liters) | 20 | | 20 | 20 |
| Containers/hectare of invention | 0.05 | | 0.00775 | 0.04667 |
| Total containers/ha-tank mix | | | 0.05441167 | |

For example, in 32 million potential hectares of use, and if we consider a use dose of 1 liter/hectare of the invention, the number of containers that would stop being used would be:

| | 32,000,000 | Potential hectares |
|---|---|---|
| | 1 | Use dose (liters/ha) |
| Containers/hectare of invention | 0.05 | 0.036  0.024 |
| | | 1,152,000  768,000 |
| Total containers to use | 1,600,000 | 1,920,000 |
| Final reduction of packaging used | 20% | |

TABLE 3

Packaging reduction for a 15:1 combination ratk

| | Invention | | Tank mix | |
|---|---|---|---|---|
| | Dicamba | 2,4-D | Dicamba | 2,4-D |
| Composition (% by weight of active ingredient/liter of formulation) | 4.0 | 60.0 | 20.0 | 30.0 |
| Dose (liters/hectare of formulation) | | | 0.2 | 2 |
| Dose (% by weight of active ingredient/liter of formulation) | 4.0 | 60.0 | 4.0 | 60.0 |
| Container size (in liters) | 20 | | 20 | 20 |
| Containers 1 hectare invention | 0.05 | | 0.01 | 0.1 |
| Total containers/ha-tank mix | | | 0.11 | |

For example, in 32 million potential hectares of use, and if we consider a use dose of 1 liter/hectare of the invention, the number of containers that would stop being used would be:

| | 32,000,000 | Potential hectares |
|---|---|---|
| | 1 | Use dose (liters/ha) |
| Containers/hectare of invention | 0.05 | 0.01  0.1 |
| | | 320,000  3,200,000 |
| Total containers to use | 1,600,000 | 3,520,000 |
| Final reduction of packaging used | 120 | |

From these three examples above, the best performance of the invention as compared to tank mix becomes apparent. This results in lower costs and less environmental impact.

Regarding its effectiveness in field trials, the following table (Table 4) shows the results which have been obtained, evidencing the synergy of the formulation of the invention when compared to the additive activity of the individual compounds.

TABLE 4

Herbicide of the invention: Post-emergent application of weeds
Herbicide (i): 2,4-D and Herbicide (ii): Dicamba

| | 2,4-D (30.0% by weight/liter Microemulsion) | | Dicamba (20.0% by weight/liter Microemulsion) | | Invention (2,4-D + Dicamba) | | % of Control expected |
|---|---|---|---|---|---|---|---|
| Weed species | Dose (% ai/ha) | % of control | Dose (% ai/ha) | % of control | Dose (% ai/ha) | % of control | according to Colby's Equation |
| Conyza <30 cm in height | 22.5 | 2.2 | 3.6 | 0 | 22.5 + 3.6 | 63 | 22 |
| Conyza <30 cm in height | 30.0 | 3.0 | 4.8 | 0 | 30.0 + 4.8 | 60 | 30 |
| Conyza <30 cm in height | 51.0 | 4.0 | 8.16 | 0 | 51.0 + 8.16 | 83 | 40 |
| Conyza >30 cm in height | 22.5 | 2.2 | 3.6 | 0 | 22.5 + 3.6 | 50 | 22 |
| Conyza >30 cm in height | 30.0 | 2.8 | 4.8 | 0 | 30.0 + 4.8 | 52 | 28 |

TABLE 4-continued

Herbicide of the invention: Post-emergent application of weeds
Herbicide (i): 2,4-D and Herbicide (ii): Dicamba

| Weed species | 2,4-D (30.0% by weight/liter Microemulsion) | | Dicamba (20.0% by weight/liter Microemulsion) | | Invention (2,4-D + Dicamba) | | % of Control expected according to Colby's Equation |
|---|---|---|---|---|---|---|---|
| | Dose (% ai/ha) | % of control | Dose (% ai/ha) | % of control | Dose (% ai/ha) | % of control | |
| Conyza >30 cm in height | 51.0 | 3.7 | 8.16 | 0 | 51.0 + 8.16 | 72 | 37 |
| Guacha soybean | 22.5 | 9.0 | 3.6 | 0 | 22.5 + 3.6 | 97 | 90 |
| Guacha soybean | 30.0 | 9.6 | 4.8 | 0 | 30.0 + 4.8 | 98 | 96 |
| Guacha soybean | 51.0 | 9.8 | 8.16 | 0 | 51.0 + 8.16 | 100 | 98 |

References: Dose (% ai/ha): use dose expressed in % by weight of active ingredient per hectare.
% of control expected according to Colby's Equation: Colby's Equation was applied to determine if the combination of herbicide (i) and herbicide (ii) shows a synergistic effect (See SR Colby, "Calculation of synergistic responses and antagonists of herbicide combinations". Weeds 1967, 1, pp 20-22).

For this, the Colby equation was used:

$$E = X + Y - (X \cdot Y/100)$$

wherein:

X is the percentage of control of the herbicide (i) at a dose per hectare A.

Y is the percentage of herbicide control (ii) at a dose per hectare B.

E is the percentage of control of herbicide (i)+herbicide (ii) at the doses per hectare A+B.

The E value corresponds to the effect (damage or damage to the plant) that is to be expected if the activity of the individual compounds is additive. If the observed effect is greater than the E value calculated according to Colby's equation, we can say that there is a synergistic effect.

It can be seen in Table 4: "herbicide of the invention: post-emergence application of weeds" that there were separately tested herbicides 2,4-D, (30.0% by weight of active ingredient per liter of microemulsion) and Dicamba, (20.0% by weight of active ingredient per liter of microemulsion), and the invention in the 6:1 ratio applied in three different doses, on two very common weeds (*Conyza* spp, and Guacha Soybean), and one of them in two different sizes (*Conyza* spp. of less and more than 30 cm in height, which corresponds to a different degree of difficulties in control).

Said table shows us that in the case of the 2,4-D herbicide, applications with dose increments from 22.5 to 51.0% by weight of active ingredient per hectare increase the control of *Conyza* spp. (from 22% to 40% of control in cases of less than 30 cm in height and from 22% to 37% in cases of more than 30 cm in height).

We can also verify that in the case of Dicamba applied alone, it failed to control either of the two weeds, considering a null herbicidal activity at the doses used ranging from 3.6 to 8.16% by weight of active ingredient per hectare.

However, we can see the surprising effect of using the herbicide of the invention in the same formulation with the same doses per hectare of active ingredient that were used separately in the previous cases, and even higher than the sum of the two separate effects.

That is, it is considered that there is synergy (or synergistic effect) when the result of the percentage of control achieved by a mixture of herbicides according to the Colby formula is greater than the percentage of control expected from the sum of the individual effects.

Therefore, and as observed in the last column of the table (% of control expected according to Colby's equation), the expected control percentages are much lower than those actually achieved by the invention; hence, the invention is superlatively superior, and its synergistic effect, fully appreciable.

Each tested liter of the invention of 2,4-D and Dicamba of Table 4 has 30.0% by weight per liter of active ingredient of 2,4-D plus 4.8% by weight per liter of active ingredient of Dicamba.

Table 4 is just an example of the doses used to control a certain weed: *Conyza*. Therefore the doses used to control it do not reflect the mentioned doses of 0.4 to 5.1 liters/hectare, since, for some weeds, 0.4 liters/hectare will be enough (for example, to control turnips) and, for other weeds and/or for another concentration of the products within the invention, 5.1 liters/hectare of formulated product will be required.

*Conyza* is the least sensitive weed to herbicides and the toughest, that is, the most difficult to control. Therefore, by controlling the *Conyza* it is understood that the rest of the list mentioned above can be controlled.

This list comes from the information registered in Argentina for the active ingredients 2,4-D and Dicamba in weed control.

Various additional chemical compounds have been used to achieve the product of interest. The formulation enables the active ingredients to be stabilized to obtain a stable final product with great biological efficacy at a lower amount of active ingredient per hectare.

Additional chemical compounds comprise emulsifiers, defoamers, antifreeze agents, acidifier, pH corrector, solvent, and co-solvent.

The emulsifier is selected from the group consisting at least of compounds of the type of coconut amide, cocoamide, propyl betaine, diphenylformamide.

The defoamer is selected from the group consisting of at least silicone-emulsion-type compounds.

The antifreeze agent is selected from the group consisting at least of compounds of the type of ethylene glycol, propylene glycol, glycerin.

The pH corrector is selected from the group consisting at least of compounds of the type of ethylmethylamine, diethylamine, dimethylamine type compounds.

The acidifier is selected from the group consisting of at least phosphoric acid, glacial acetic acid, sulfuric acid.

The solvent is generally water.

The co-solvent is selected from the group consisting at least of compounds of the type of methyl ester of fatty acids of vegetable origin, methyl ester of fatty acids of animal origin.

A consistent work has been done in achieving the emulsion trying to avoid precipitation, crystallization, or phase separation of the product; without affecting the biological efficacy of the final product. The harmonized formulation is considered a microemulsion, which is formed by a water base and emulsified active ingredients in very small drops. The chosen emulsifier and the quantity used allow to keep the emulsion in drops.

The formulation process of the invention is described below. The process is a batch process, in which technical grades of 2,4-D and Dicamba are mixed with the solvents, antifreeze agent, defoamer and emulsifier.

A—Formulation Stage:

A certain percentage of the total solvent is poured into a stainless-steel formulator tank and stirring begins, then the Technical Grades are added, that is, 2,4-D and Dicamba.

Afterwards, the corresponding pH corrector(s) are added with continuous stirring for a certain time after finishing said addition.

Then, always under stirring and at a certain temperature, the co-solvents are transferred to the formulator and stirring is continued until a homogeneous mixture is obtained.

Subsequently, the defoamers and the emulsifiers are added.

Finally, the antifreeze agent(s) are added and stirring is continued for a while, until a homogeneous mixture is obtained.

B—Adjustment and Packaging Stage:

Once formulated, a sample of the product is taken and sent to the laboratory, to then adjust if necessary the pH with the pH correctors and the corresponding acidifier(s), and the final concentration, by adding the rest of the required solvents.

After laboratory approval, the formulation is transferred to a transfer tank to proceed with the packaging in the established presentation.

EXAMPLES

Several examples of formulations of the invention are proposed below:

Example No. 1

| Function | Concentration (% w/v) |
| --- | --- |
| Active ingredient (i) | 7.50% |
| Active ingredient (ii) | 1.20% |
| Emulsifiers | 18.00% |
| Co-Solvents | 2.50% |
| PH correctors | 1.65% |
| Defoamers | 0.05% |
| Acidifiers | 0.30% |
| Antifreeze agents | 1.50% |
| Solvents | 60% |

Example No. 2

| Function | Concentration (% w/v) |
| --- | --- |
| Active ingredient (i) | 35.00% |
| Active ingredient (ii) | 3.00% |
| Emulsifiers | 32.00% |
| Co-Solvents | 8.90% |
| PH correctors | 7.80% |
| Defoamers | 0.15% |
| Acidifiers | 0.80% |
| Antifreeze agents | 7.40% |
| Solvents | 26% |

Example No. 3

| Function | Concentration (% w/v) |
| --- | --- |
| Active ingredient (i) | 40.00% |
| Active ingredient (ii) | 6.40% |
| Emulsifiers | 37.00% |
| Co-Solvents | 9.10% |
| PH correctors | 8.50% |
| Defoamers | 0.17% |
| Acidifiers | 1.00% |
| Antifreeze agents | 7.80% |
| Solvents | 20% |

Example No. 4

| Function | Concentration (% w/v) |
| --- | --- |
| Active ingredient (i) | 8.00% |
| Active ingredient (ii) | 33.00% |
| Emulsifiers | 35.00% |
| Co-Solvents | 9.00% |
| PH correctors | 8.20% |
| Defoamers | 0.16% |
| Acidifiers | 0.90% |
| Antifreeze agents | 7.70% |
| Solvents | 28.00% |

Several field tests have been carried out, where the effectiveness of the formulation of the invention was compared with the most used commercial products. The following graphs show the best performance of the invention on weeds more resistant to herbicides.

Graph No. 1 (see FIG. 1) evaluates different formulations of microemulsions applied at doses lower than those registered by each of said products, with the aim of more easily perceiving the differences in control between treatments. As it can be seen in Graph 1, the application of only 2,4-D, a 30% microemulsion, achieves very low control values that, regardless of the size of the weed (Conyza spp. less than 30 cm in height and greater than 30 cm in height), it barely exceeds 20% of control, but when mixed in the sprayer tank with 0.18 liters/hectare of 20% of Dicamba microemulsion, the yield doubles, reaching values of 45 to 51% of control. When we compare this last tank mix with the invention (at the same amount of active ingredient per hectare) we observe that it reaches values from 50 to 63% of control, that is, 11 to 20% above the tank mix. Therefore, we can say that in the invention the physical compatibility achieved between the active ingredients is higher than that which occurs in a tank mix, and this translates into a greater biological efficiency in the field.

Graph No. 2 (see FIG. 2) shows the herbicide 2,4-D, a 30% microemulsion, which is the commercial chemical control of reference at the minimum and maximum recommended doses, and on the other hand, the formulation of the invention of the Example 2, also at the minimum and maximum doses likely to be recommended for this weed. As it can be seen, between the minimum and maximum dose of the commercial chemical control there is an increase in the percentage of control of *Conyza* spp. approximately 10% (from 28-30% of control to 37-41% of control depending on the state of the weed). But even applying the maximum dose, the control is not satisfactory, because it does not exceed 40% in the best of cases. When we visualize the minimum dose for this weed of 1 liter per hectare of the invention (which has the same amount of grams per liter of the active ingredient 2,4-D as the commercial chemical control, with the difference that the invention incorporates a proportion of Dicamba), the control efficacy is even higher than the maximum dose for this type of weed of 2,4-D, in microemulsion at 30%, for example, for *Conyza* less than 30 cm in height, from 40% to 60% of control (50% greater efficiency), but when compared with the maximum dose of the invention for the considered weed (1.7 liters per hectare) with the maximum dose of 2.4-D 30% Microemulsion (1.7 liters per hectare), the difference is even greater, since for the same growth stage of the weed, we go from 40% to 84% of the control (110% greater efficiency).

Figure 3:
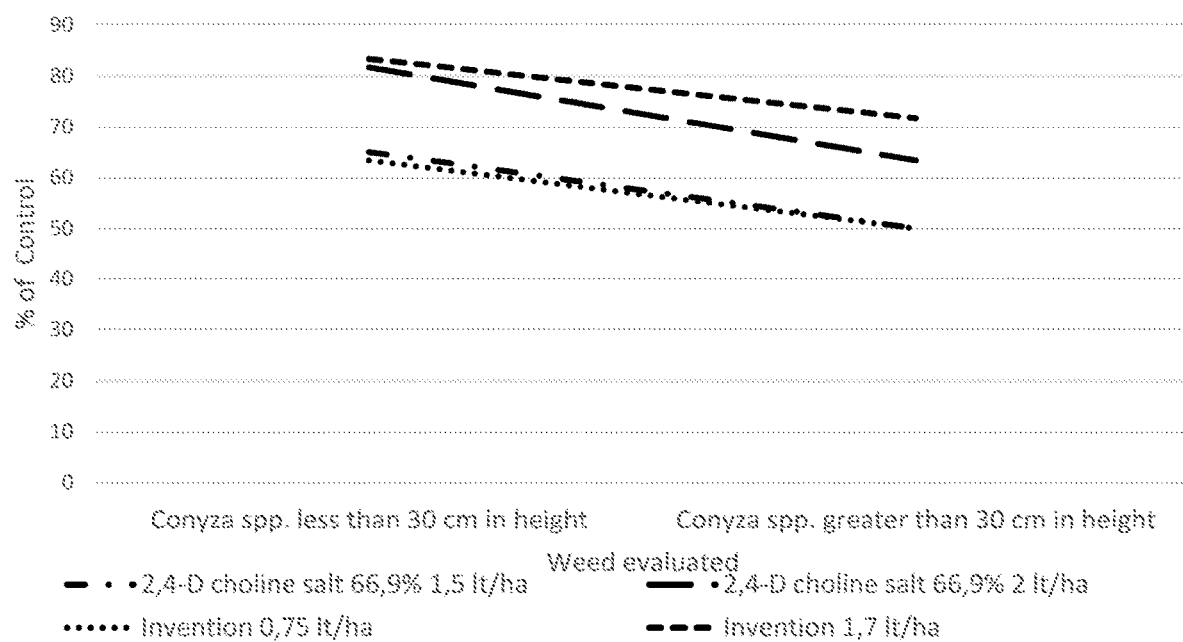
FIG. 3 is a graph (Graph No. 3) entitled "Comparative test of control efficacy using 2, 4-D choline salt 66.9% ME vs. the invention in *Conyza* spp."

Graph No. 3, (see FIG. 3) compares the two doses of the invention (0.75 and 1.7 liters per hectare) with two doses of the formulation of 2,4-D choline salt 66.9% Soluble Concentrate (SL). An important clarification is that the latter has an acid equivalent of 2,4-D of 45.6%, which means that, in 1 liter of product formulated as soluble concentrate we have 456 grams of 2,4-D acid. As it can be seen in the graph, the dose of 1.5 liters per hectare of 2,4-D choline salt 66.9% SL and equivalent to 684 grams of active ingredient of 2,4-D acid achieves control percentages ranging from 50% for *Conyza* spp. of more than 30 cm in height, reaching 65% of control in *Conyza* less than 30 cm in height, almost equal values (the lines in the graph are superimposed) to the 0.75 liters per hectare of the invention. The most important point here is that, in the latter case, in the invention we have 240 grams of active ingredient of 2,4-D, that is, with 35.0% of active ingredient (formulation of Example 2), the same control efficacy was achieved (we have to clarify that the invention also comprises Dicamba in a certain proportion). When the comparison is made at the maximum doses used, the 2 liters per hectare of 2,4-D choline salt 66.9% SL (912 grams of 2,4-D acidic active ingredient) turn out to be slightly lower in control efficacy than the invention at the dose of 1.7 liters per hectare (510 grams of 2,4-D acidic active ingredient), that is to say that with 55.9% of the amount of 2,4-D active ingredient applied per hectare, the invention achieves between 2.5% (82% vs 84% of control in *Conyza* spp. less than 30 cm in height) and 12.7% (63% vs 71% of control in *Conyza* spp. of more than 30 cm in height) more effective control even with approximately 50% of the amount of active ingredient applied per hectare.

Figure 4:
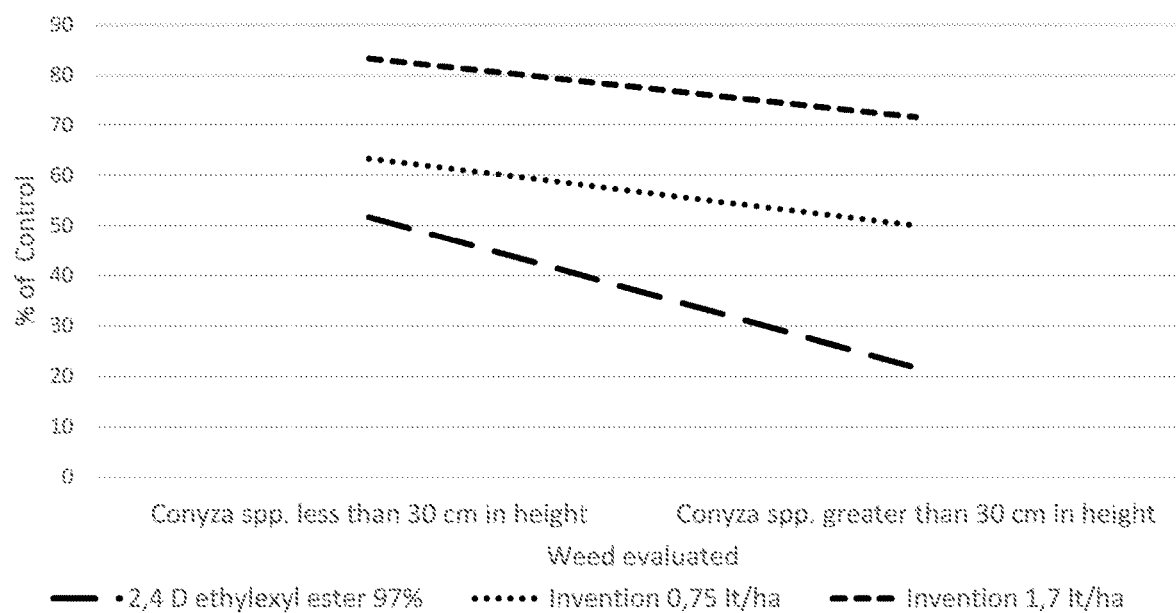
FIG. 4 is a graph (Graph No. 4) entitled "Comparative test of control efficacy using 2,4-D 2-ethylhexyl ester 97% ME vs. the invention in *Conyza* spp."

Graph No. 4 (see FIG. 4) compares two doses of the invention (of 0.75 and 1.7 liters per hectare) with one dose (0.75 liters per hectare) of the formulation of 2,4-D 2-ethylhexyl ester 97% Emulsifiable Concentrate (EC). As shown in the graph, the dose of 0.75 liters per hectare of 2,4-D 2-ethylhexyl ester 97%, which is equivalent to 727.5 grams of active ingredient of 2,4-D acid, achieves control percentages ranging from 20% for *Conyza* spp. more than 30 cm in height, reaching 52% of control in *Conyza* less than 30 cm in height, values much lower than those achieved even by the minimum applied dose of the invention of 0.75 liters per hectare, which is equivalent to 225 grams of 2,4-D acidic active ingredient, where the control efficacy is 50% and 64%, respectively. Finally, when we compare the maximum applied dose of the invention of 1.7 liters per hectare that is equivalent to 510 grams of active ingredient of 2,4-D acid, we can see that it achieves a control efficacy much higher than the applied dose of 2,4-D 2-ethylhexyl ester 97% EC, reaching 71% of control values in *Conyza* spp. over 30 cm in height to 84% of control in *Conyza* spp. of less than 30 cm in height, that is to say that with 70% of the dose of active ingredient of 2,4-D acid of the applied of the 2,4-D 2-ethylhexyl ester 97% EC, the invention achieved 238% more of control in *Conyza* spp. more than 30 cm in height (71% vs 21% of control), and 59.6% more than control in *Conyza* spp. less than 30 cm in height (83% vs 52% of control).

The composition of the invention is used from 0.4 to 5.1 liters of the microemulsion formulation per hectare, depending on the type of weed and its resistance to herbicides.

The invention claimed is:

1. A herbicidal composition comprising at least from 7.5% to 40% of 2,4-D in its acidic form and from 1.2% to 35% of Dicamba also in its acidic form as active ingredients, both formulated together in microemulsion, from 18% to 37% of emulsifier, from 2.5 to 9.1% of co-solvent, from 1.65% to 8.5% of pH corrector, from 0.30 to 1.0% acidifier, 0.05% to 0.17% defoamer, 1.5% to 7.8% antifreeze agent, and 20% to 60% solvent, the percentages of which are expressed in weight per volume of the composition.

2. The composition of claim 1, wherein the emulsifier is selected from a group consisting of coconut amide, cocoamide, propyl betaine, diphenylformamide.

3. The composition of claim 1, wherein the co-solvent is selected from a group consisting of at least fatty acid methyl ester of vegetable origin, fatty acid methyl ester of animal origin.

4. The composition of claim 1, wherein the antifoam is selected from a group consisting of at least silicone emulsions.

5. The composition of claim 1, wherein the antifreeze agent is selected from a group consisting of at least ethylene glycol, propylene glycol, glycerin.

6. The composition of claim 1, wherein the pH corrector is selected from a group consisting of at least ethylmethylamine, diethylamine, dimethylamine.

7. The composition of claim 1, wherein the acidifier is selected from a group consisting of at least phosphoric acid, glacial acetic acid, sulfuric acid.

8. The composition of claim 1, wherein the solvent is water.

9. The composition of claim 1, wherein it is used to control a great variety of weeds, present in fields without cultivation (roads, fences and railways), during chemical fallows (period that elapses since the end of the harvest from one crop to sowing of the next crop), and in crops such as winter cereals, maize and sorghum.

10. The composition of claim 1, wherein it is used in the control of broadleaf weeds such as *Sonchus oleraceus, Flaveria bidentis, Capsella bursa-pastoris, Datura ferox, Coronopus didymus, Amaranthus* spp., *Chenopodium album, Portulaca oleracea, Conyza* spp., *Bowlesia incana, Lamium amplexicaule, Xanthium cavanillesii, Glycine max, Trinthema portulacastrum, Poligonum aviculare, Anoda cristata, Cardus acanthoides, Brassica rapa, Raphanus sativum, Polygonum convolvulus, Carduus nutans, Silybum*

*marianum, Anthemis cotula, Matricaria chamomilla, Ammi majus, Viola arvensis, Erodium cicutarium, Xanthium* sp., *Centaurea solstitialis, Stellaria media, Datura ferox, Rumex crispus, Physallis mendocina, Kochia scoparia, Salsola kali, Chenopodium pumulio, Diplotaxis tenuifolia, Brassica campestris, Raphanus sativus, Brassica nigra, Rapistrum rugosum, Raphanus raphanistrum, Sicyos polyacanthus, Commelina virginica, Wedelia glauca, Ambrosia tenuifolia, Sida rhombifolia, Verbena intermedia, Ipomoea* sp., *Bidens pilosa, Cyperus* spp., *Geoffroea decorticans, Acacia aroma, Cestrum parqui, Centaurea calcitrapa, C. solstitialis, C. melitensis, Erodium cicutarium, Silybum marianum; Cardus pycnocephalus, Salsola Kali, Taraxacum officinale, Plantago lanceolata, Brassica campestris B. napus, Hydrocotyle bonaeriensis, Carduus nutans, Camelina sativa, Carthamus lanatus, Cirsium vulgare, Xanthium spinosum, Verbecina encelioide, Medicago lupulina, Kochia scoparia, Cychorum intybus; Ambrosia tenuifolia, Ammi visnaga, Onopordon acanthium, Cynara cardunculus, Conium maculatum, Convolvulus arvensis, Tagetes minuta, Salpichroa origanifolia, Alternathera philoxeroides, Dichondra repens, Hypochoeris brasilensis, Baccharis coridifolia, Melilotus indicus, Lonicera sempervirens, Artemisa verlotorum.*

11. The composition of claim 1, wherein from 0.4 to 5.1 liters of the microemulsion formulation per hectare are used.

\* \* \* \* \*